United States Patent [19]

Igarashi

[11] Patent Number: 4,814,892

[45] Date of Patent: Mar. 21, 1989

[54] RECORDING APPARATUS INCLUDING CONTROL ERROR DETECTION

[75] Inventor: Masaru Igarashi, Kawasaki, Japan

[73] Assignee: Canon Kabushiki Kaisha, Tokyo, Japan

[21] Appl. No.: 87,517

[22] Filed: Aug. 20, 1987

[30] Foreign Application Priority Data

Aug. 30, 1986 [JP] Japan .............................. 61-202718

[51] Int. Cl.[4] ............................................. H04N 1/23
[52] U.S. Cl. ..................................... 358/296; 400/74; 340/790; 364/900
[58] Field of Search ........................ 400/74; 340/790; 358/296; 364/900

[56] References Cited

U.S. PATENT DOCUMENTS 4,476,542 10/1984 Crean ................................... 364/900
4,686,525 8/1987 Nagaya .............................. 340/790

FOREIGN PATENT DOCUMENTS 57-123760 2/1982 Japan .

*Primary Examiner*—E. A. Goldberg
*Assistant Examiner*—Scott Rogers
*Attorney, Agent, or Firm*—Fitzpatrick, Cella, Harper & Scinto

[57] ABSTRACT

There is a recording apparatus such as a laser beam printer comprising: a host computer as an external unit for inputting data to be recorded and control command to process the recording data; a recorder to record onto a recording medium in accordance with the input data; an error detector to detect errors in the input control commands; a data generator to generate an error code indicative of the occurrence of the error when the error is detected by the error detector; and a controller to control the recorder so as to record the error code onto the recording medium together with the input data. The error code is recorded as an error pattern of a visible image to the end portion of the recording medium such as a cut sheet paper. With the apparatus, the operator can easily know of the occurrence of the error in the input data and the kind and position of the error without interrupting the recording operation. The recording efficiency is improved.

13 Claims, 6 Drawing Sheets

RECORDING APPARATUS INCLUDING CONTROL ERROR DETECTION

BACKGROUND OF THE INVENTION

1. Field of the Invention

The present invention relates to a recording apparatus for recording onto a recording medium in accordance with input information from an external apparatus such as a host computer or the like.

2. Related Background Art

The recording apparatus such as a printer or the like receives a print code and a control command which are transmitted from the host computer and records onto a recording medium. In a conventional printer, the function is low, the number of control commands is small, and a structure is simple. However, in recent years, a type of printer called a non-impact printer such as a laser beam printer or the like has been developed (U.S. Pat. No. 4,059,833). Such a kind of printer expresses characters or images as a set of dots and has a very high function. With the improvement of the function, the number of control commands to instruct the functions is also increased and the structure of the control command becomes more and more complicated. For example, in the case where a font of a character to be printed is designated and this font is not prepared, there is provided a function such as to select the font of the type which is the nearest to the designated font (U.S. Pat. No. 4,686,525 or to independently make the font character thick in the vertical and lateral directions (U.S. patent application Ser. No. 854,193), or the like. Therefore, the number of errors of the control commands also increases.

Figure 2A:
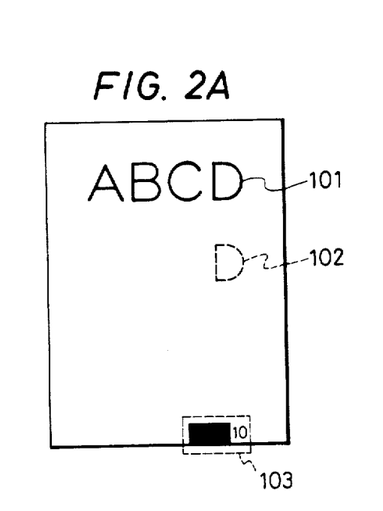
FIG. 2A is a diagram showing the result of the output in the first embodiment.

However, hitherto, even if an error exists in the control command, the printer merely ignores it and continues the recording without displaying the presence of the error. Therefore, it is impossible to determine whether the result of the recording is correct or not. As a practical example, FIG. 2A shows an example of the print in which when a position moving command exists before "D" is printed at a position indicated at 101 and "D" must be correctly printed at a position indicated at 102, an error is included in the position moving command and "D" is printed at the position 101 because this command has been ignored. However, even if this output result is seen, it is impossible to discriminate the error in the position moving command. In addition, there is a case where an error in one control command exerts an influence on the subsequent control commands. In this case, it is also difficult to find out the cause from the result of the recording. As described above, there is a danger such that even if an error exists in a control command and the erroneous recording was performed, it is difficult to discriminate the presence of the error by merely seeing the result of the recording, so that the recorded paper is erroneously delivered.

SUMMARY OF THE INVENTION

It is an object of the present invention to provide a recording apparatus in which the foregoing drawbacks are eliminated.

Another object of the invention is to provide a recording apparatus which can easily know the presence of an error in the input information.

Still another object of the invention is to provide a recording apparatus which can easily know the position and kind of error in the input information.

The above and other objects and features of the present invention will become apparent from the following detailed description of the preferred embodiments, taken with reference to the accompanying drawings.

DETAILED DESCRIPTION OF THE PREFERRED EMBODIMENTS

The preferred embodiments of the present invention will be described in detail hereinbelow with reference to the drawings.

Figure 1:
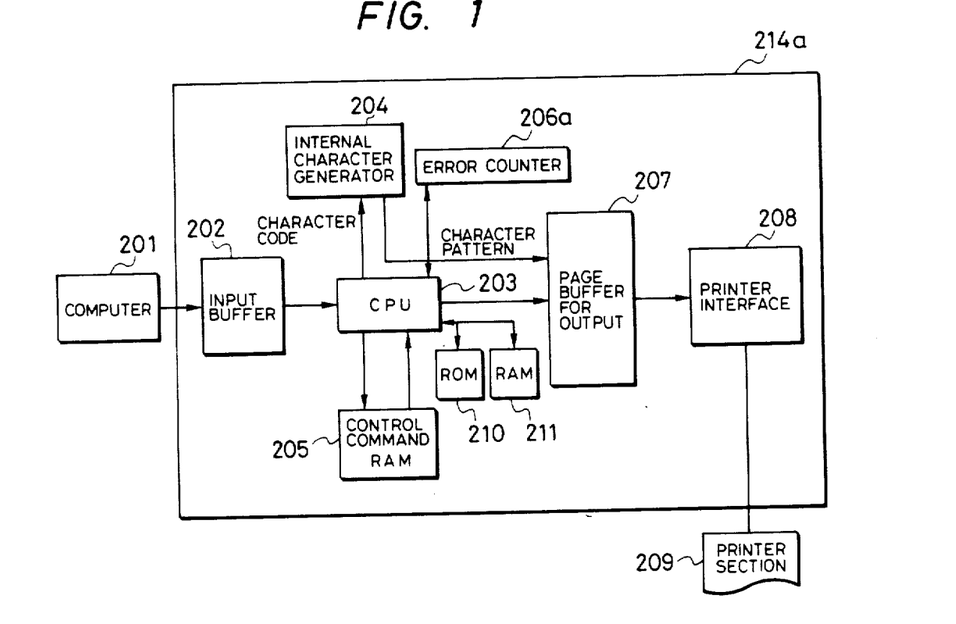
FIG. 1 is a block constitutional diagram of a recording apparatus in the first embodiment.

FIG. 1 is a block constitutional diagram of a recording apparatus in the first embodiment and shows the case where character code data and control commands which are sent from the host side such as a computer or the like are received and a character pattern (hereinafter, symbols and the like are also called characters in the embodiment) is recorded by a page printer or the like such as a laser beam printer or the like. In FIG. 1, reference numeral 201 denotes a computer (host computer) to generate character code data and control commands (control instructions), which will be explained hereinlater; 202 is an input buffer to temporarily store the character code data and control commands; 203 a CP consisting of a general microprocessor; 210 a ROM in which processing programs are stored; 211 a RAM as an auxiliary storage device; 204 a character generator to generate the character dot pattern in accordance with the character code data; 205 a control command RAM to store a table to analyze the control commands; and 206a an error counter to count the number of errors generated every page in the case where errors exist in the control commands and the like or in their processes.

Numeral 207 denotes a page buffer for output consisting of a RAM to store image data of one page; 208 is a printer interface to generate a video signal from the dot data of the page buffer 207 while keeping the interface with the printer; 209 a page printer as an output apparatus for receiving the video signal and actually recording the image; and 214a a control board in the first embodiment.

The operation of the circuit shown in FIG. 1 will now be described in detail.

Figure 4:
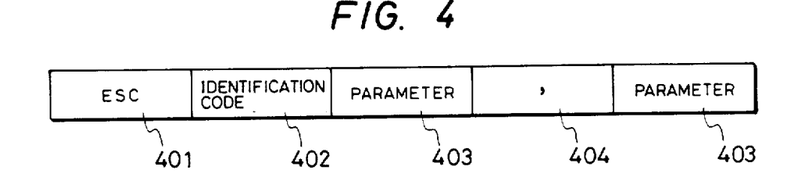
FIG. 4 is a constitutional diagram of a control command in the embodiment.

First, a structure of a control command in the embodiment shown in FIG. 4 will be described. In FIG. 4, reference numeral 401 denotes a special code indicative of a control command called an ESC (code 1/11); 402 is a symbol indicative of the identification of each control command; and 403 a parameter which is used for each control. The number of parameters is predetermined every control command. Numeral 404 denotes a delimiter "," between parameters.

Figure 3:
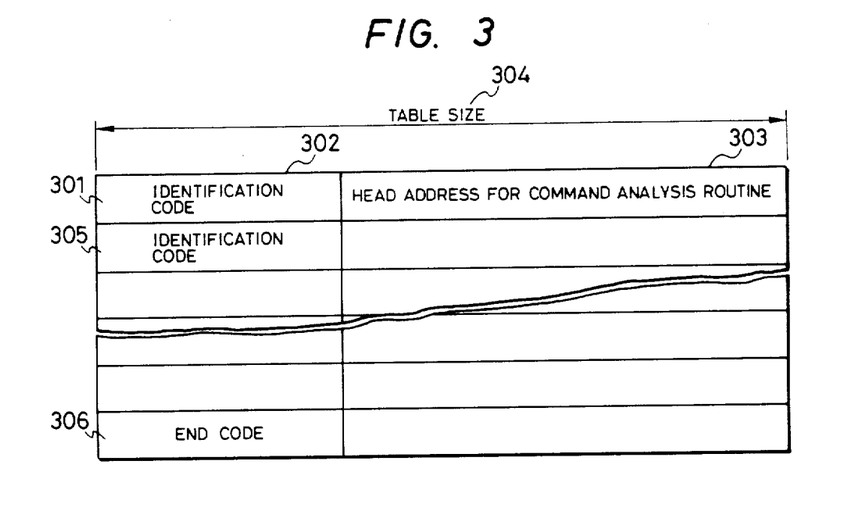
FIG. 3 is a structural diagram of a control command RAM in the embodiment.

The table of the control command RAM 205 necessary to analyze the control command will now be described. FIG. 3 shows a structural diagram of the control command RAM 205 in the embodiment.

Identification codes 302 are arranged in the RAM 205 in accordance with the order of 301, 305, ... This code corresponds to identification code 402 of the structure of the control command shown in FIG. 4. Numeral 303 denotes a head address of a command analysis and processing routine corresponding to the identification code 302. The identification code 302 and command analysis routine head address 303 constitute one set. A number of the sets as many as the number of control commands exist and form a table. An end code 306 as a special code indicative of the end of the effective identification code 302 is finally arranged. The end of table is discriminated by the end code 306. A table size 304 is constituted by the identification code 302 and command analysis routine head address 303.

Figure 5:
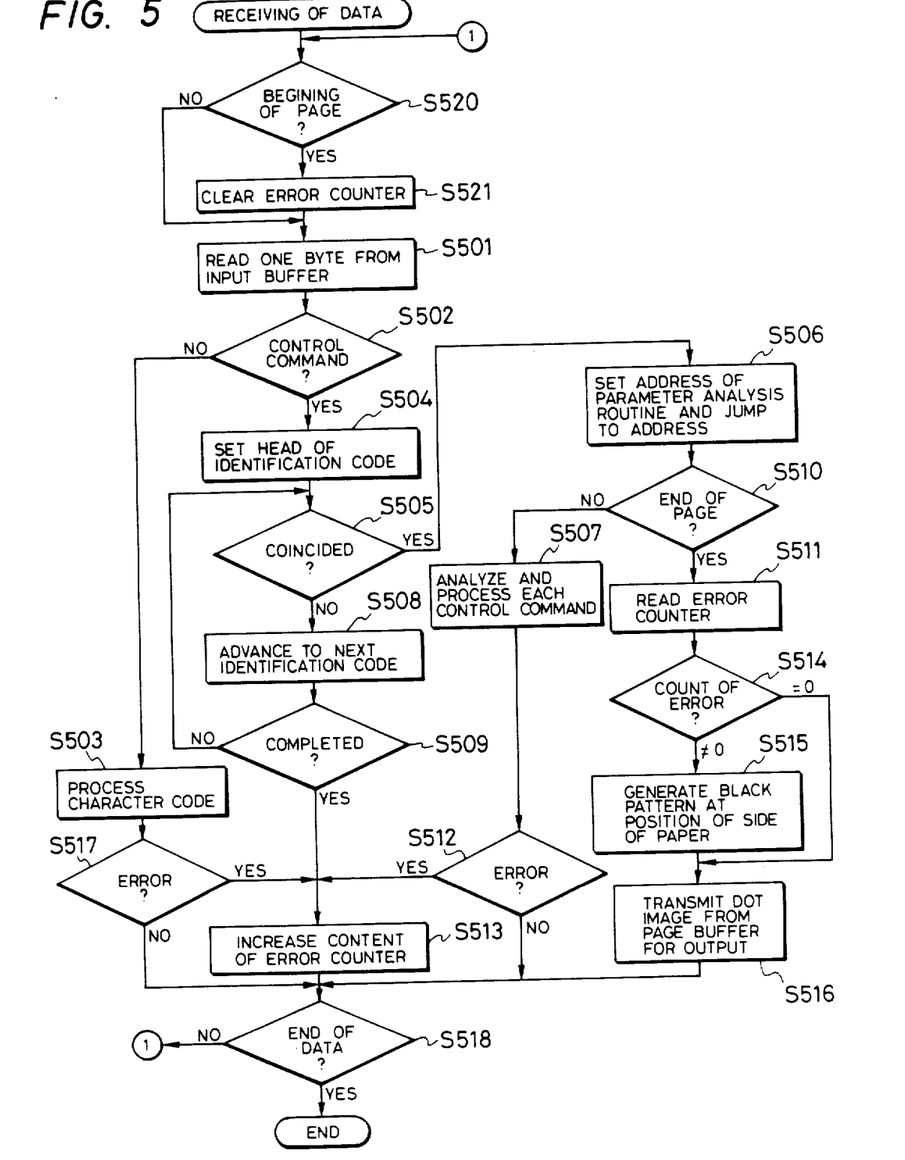
FIG. 5 is an operational flowchart for the recording apparatus in the first embodiment.

The operation of the recording apparatus in the foregoing embodiment will now be described with reference to a processing flowchart stored in the ROM 210 for the recording apparatus in the first embodiment of FIG. 5.

First, the data transmitted from the computer 201 is temporarily stored into the input buffer 202. In step S520, a check is made to see if the beginning of page has been detected or not. If YES, the error counter 206a is cleared in step S521. In step S501, data of one byte is read from the input buffer. In step S502, a check is made to see if the read data is the control command or not. Namely, a check is made to see if the read data coincides with the ESC (1/11) 401 in FIG. 4 or not. If NO, the read data is regarded to be character data and the character code process is executed in step S503. After completion of the character code process, a check is made to see if an error has been detected or not in step S517. Namely, a check is made to see if the character corresponding to the read character code exists or not. If an error has been detected, i.e., if the corresponding character does not exist, the count value of the error counter 206a is increased in step S513.

If the read data coincides with the ESC in step S502, this means the control command. Therefore, in step S504, the next one byte, i.e., the identification code 402 is read and in order to search the same identification code as the identification code 402 of the read control command from the table in the control command RAM 205, the head address to indicate the head position 301 in the RAM 205 is set, thereby preparing to sequentially read out the control commands from the head address. In step S505, a check is made to see if the identification code 402 of the read control command coincides with the identification code 301 written in the head of the RAM 205 or not. If NO in step S505, step S508 follows and the address corresponding to a data amount of the table size 304 is added to the present address and the address is advanced to the next identification code 305. In step S509, a check is made to see if the code read out of the RAM 205 coincides with the end code 306 or not. If YES, this indicates the end of table in the RAM 205. Therefore, this means that the coincident identification code does not exist. Thus, it is determined that an undefined control command error exists. The count value of the error counter 206a is increased in step S513. If the read code does not coincide with the end code, the processing routine is returned to step S505. The discriminating processes to compare with the identification code 402 are repeated in steps S505 to S509. In this manner, if the code which coincides with the identification code 402 has been detected in the control command RAM 205, the head address 303 of the control command analysis processing routine which was determined to be coincident is set and the process is jumped to this address in step S506. In step S510, the control command is analyzed and a check is made to see if the control command is the command for the end of page or not. If NO, in step S507, the other control command is analyzed and processed. In step S512, a check is made to see if an error is detected in the analysis and process or not. Namely, a check is made to see if the value of the parameter of the control command is proper or not, or if the number of parameters is proper or not, or the like. If the numerical value of the parameter is too large or too small or if the number of parameters lacks, it is decided that the parameter error exists. Then, the count value of the error counter 206a is increased in step S513. These processes are repeated until the control command indicative of the end of page is detected.

Figure 2B:
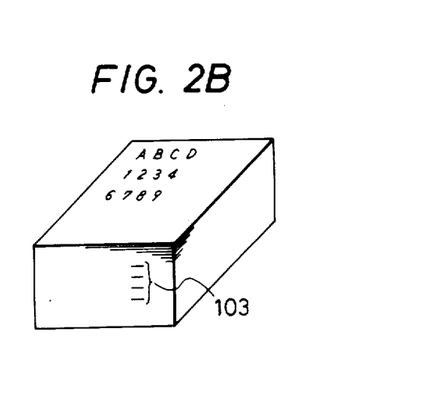
FIG. 2B is a perspective view showing a state in which papers in FIG. 2A have piled up.

If the control command indicative of the end of page has been detected, the count value of the error counter 206a is read in step S511. A check is made in step S514 to see if the count value of the error counter 206a is 0 or not. If NO, it is determined that an error was included. In the next step S515, a black pattern and a pattern to record the count value of the error counter 206a are generated at the position of the end of paper from the character generator 204. In step S516, the dot image is transmitted from the page buffer 207 for output to the printer interface 208, thereby allowing a video signal to be generated. As shown in the result of the output in the first embodiment of FIG. 2A, the black pattern and the count value of the error counter 206a are recorded at the position of an end 103 of paper by the printer section 209. Since the generation of an error is recorded at the position of the end 103 of paper of the same page, when the print papers in FIG. 2A have been piled up as shown in FIG. 2B, the error mark recorded to the paper end can be discriminated from the outside. In step S518, a check is made to see if the end of data has been detected or not. The foregoing processes are repeated until the end of data is detected.

In this embodiment, the full black pattern and the count value of the error counter have been recorded to the end of paper. However, only a pattern may be recorded. It is sufficient to use a mark which is recorded to face the end portion of the paper as a mark to inform the operator of the page having an error. This mark is not necessarily limited to the full black mark. Since it is an object of the invention to make it possible to easily discriminate the occurrence of an error when the print papers were piled up, an arbitrary shape can be used as a mark if a line is substantially recorded so as to face the end portion of the paper.

On the other hand, by changing the size of pattern, the number of errors can be also informed or the significance of error (i.e., serious error or insignificant error) can be also informed.

The content of the error (the page number having an error or the like) can also be expressed by changing the position of the black pattern. Assuming that not only an error of the control command but also the case of printing at a position out of the paper are regarded as the occurrence of an error, this case can be also counted by the error counter. In place of the error counter, the error code of each error is predetermined and the error code can be also printed when an error was detected.

As described above, since the occurrence of an error is recorded at the end of print paper, after the print data was output, the presence or absence of an error can be checked when the print papers were piled up. Therefore, there is no need to check the presence or absence of an error every paper and the print efficiency is remarkably improved. In addition, it is also possible to prevent that the output result including an error is erroneously delivered. On the other hand, if an error has been further detected during the output, the processes such that the printing is stopped and the error is notified to the operator are not performed, so that a decrease in throughput can be also prevented. In particular, this effect is large in the case where the host computer and the printer as an image forming unit are connected by on-line.

Figure 6:
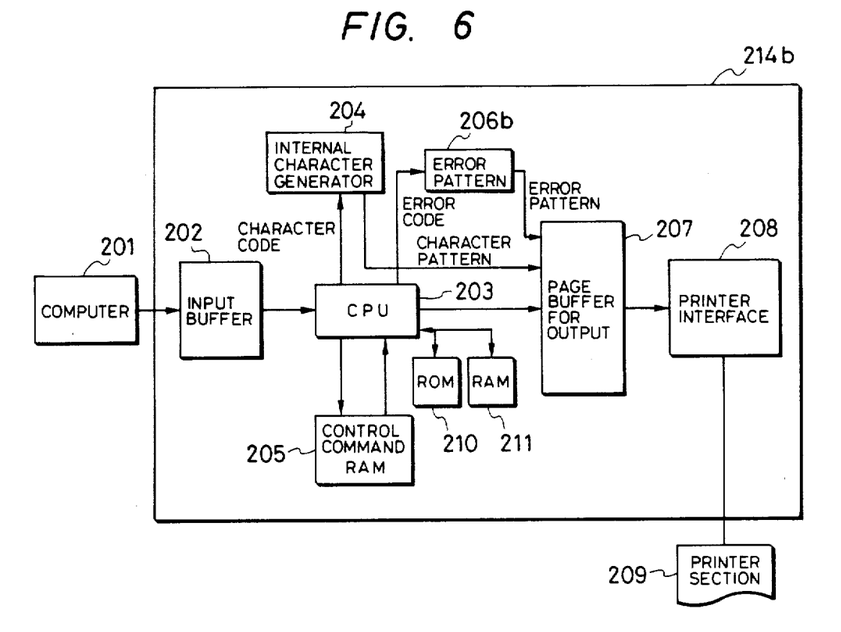
FIG. 6 is a block constitutional diagram of a recording apparatus in the second embodiment.

FIG. 6 is a block constitutional diagram of a recording apparatus in the second embodiment. The recording apparatus of the second embodiment differs from the recording apparatus of FIG. 1 with respect to a point that the error counter 206a of the control board 214a is replaced to an error pattern generator 206b of a control board 214b. The other constitution and operation are substantially the same as those of the recording apparatus of FIG. 1; therefore, the same parts and components are designated by the same reference numerals. When errors occur in the input data or its processes, the error pattern generator 206b generates an error pattern corresponding to each error and writes into the page buffer 207 for output every time the error pattern is generated. On the other hand, a constitution of control commands and a constitution of a table in the control command RAM 205 are the same as those shown in FIGS. 3 and 4 mentioned above.

Figure 8:
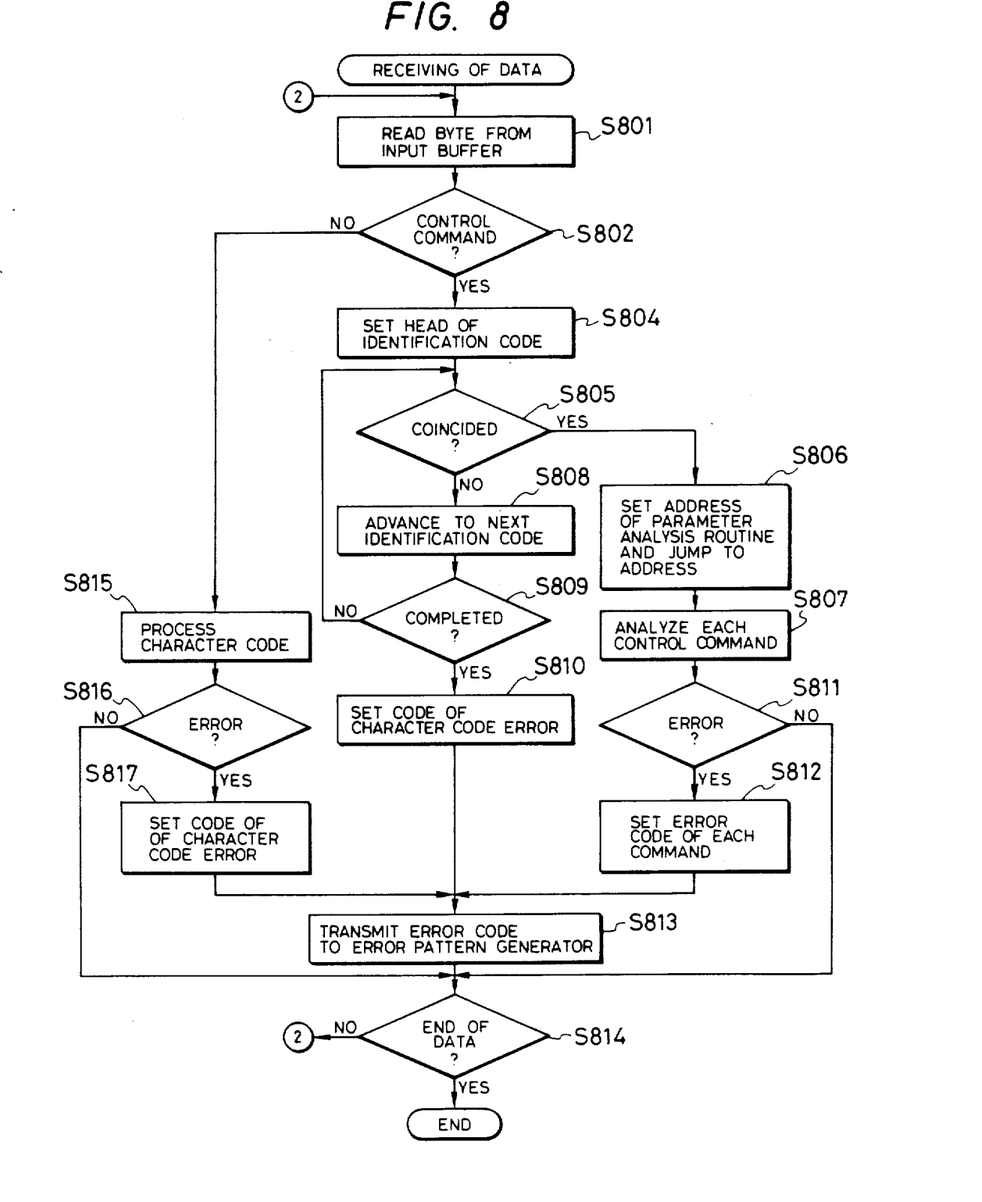
FIG. 8 is an operation flowchart of the recording apparatus in the second embodiment.

FIG. 8 shows a processing flowchart stored in the ROM 210 for the recording apparatus in the second embodiment.

First, the data transmitted from the computer 201 is temporarily stored into the input buffer 202. In step S801, one byte is read out of the input buffer 202. In step S802, a check is made to see if the read data is a control command or not. Namely, a check is made to see if the read data coincides with the ESC (1/11) 401 in FIG. 4 or not. If NO, the read data is regarded as character data and in the next step S815, the character code process is performed. After completion of the character code process, a check is made in step S816 to see if an error has been detected or not in a manner similar to step S517 in FIG. 5. If YES, an error code is set in step S817. In step S813, the error code is sent to the error pattern generator 206b and the error pattern is stored into the page buffer 207 for output.

If the read data coincides with the ESC 401 in step S802, this data is the control command. Therefore, in step S804, the next one byte, i.e., the identification code 402 is read. In order to search the same identification code as the identification code 402 of the read control command from the table in the control command RAM 205, the head address indicative of the head position 301 in the RAM 205 is set, thereby preparing to sequentially read out the control commands from the head address. In step S805, a check is made to see if the identification code 402 of the read control command coincides with the identification code 301 written in the head of the RAM 205 or not. If NO, the address corresponding to the data amount of the table size 304 is added to the present address and the address is advanced to the next identification code 305 in step S808. In step S809, a check is made to see if the code read out of the RAM 205 coincides with the end code 306 or not. If YES, since the read code indicates the end of table in the RAM 205, this means that the coincident identification code does not exist. Therefore, it is determined that the read code is the undefined control command error and in the next step S810, an error code is set. In step S813, the error code is sent to the error pattern generator 206b and the error pattern is stored in the page buffer 207 for output.

If the read code does not coincide with the end code, the processing routine is returned to step S805 and the discriminating processes to compare with the identification code 402 in steps S805 to S809 are repeated. If there is detected a code which coincides with the identification code 402 in the RAM 205 as described above, the head address 303 of the analysis processing routine of the coincident control command is set and the address is jumped to this address in step S806. The analysis and process of the control command are executed in step S807. After completion of the analysis and process, a check is made to see if errors have been detected in the analysis and process or not in step S811 in a manner similar to step S512 in FIG. 5. If YES, an error code is set in step S812. In step S813, the error code is sent to the error pattern generator 206b and an error pattern is stored into the page buffer 207 for output. In step S814, a check is made to see if the end of data has been detected or not. If NO, the processing routine is returned to step S801 and the foregoing operations are repeated until the end of data is detected.

If the read control command indicates the end of page, a dot image is transmitted from the page buffer 207 for output to the printer interface 208, thereby allowing a video signal to be generated. As shown in the result of the output in the second embodiment of FIG. 7, the error pattern corresponding to the error code is recorded at the print position at which the error occurred. For example, if an error occurred in the position movement control command and a print data after the movement of the position is "D", "D" exists at a position indicated at 701 and a pattern 703 indicative of the error of the position movement control command is recorded.

Figure 7:
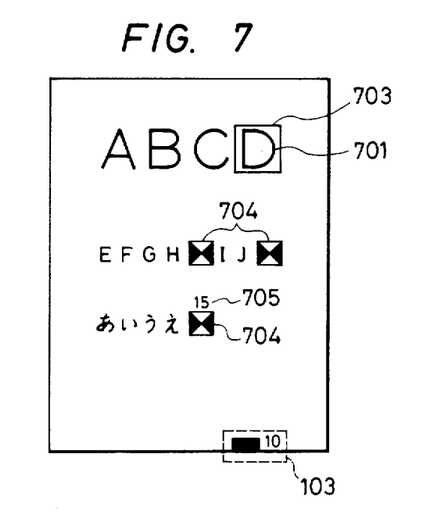
FIG. 7 is a diagram showing the output result in the second embodiment.

Although the error pattern corresponding to the error code has been generated in this embodiment, a constitution will be simplified if the error pattern is set to a single kind as shown at 704. In this case, although it will be understood that an error exists, it is unclear in which command the error occurred. However, since the position of the error can be known, the cause of the error can be known. By further developing this constitution, it is also possible to record the error code although the error pattern is set to a single kind. Reference numeral 705 denotes an error code in this case. The error code is recorded as a small character over the error pattern 704 recorded.

On the other hand, the error pattern generator 206b may be also included in the character generator 204. In this case, the error code is used in place of the character code.

As described above, if an error occurred in a control command or the like during the recording, by generating the error pattern corresponding to the error to the recording position at which the error occurred in the page during the recording, the occurrence of the error, the kind of error, and the recording position at the time of the occurrence of the error can be communicated to the operator or the person who transmitted the data, thereby providing a clue to clarify the cause of the error. In addition, the presence or absence of the output page in which the error exists is communicated to the operator. Therefore, a danger such that the erroneous recorded paper is delivered is eliminated. In addition, even if an error of the control command occurred, the recording operation is not stopped, so that the recording efficiency is very improved. In particular, in the case where the recording apparatus is connected with the host computer by the on-line, since a plurality of operators commonly use a single recording apparatus, the point that the recording operation can be continued even if an error occurs provides a very large effect.

Figure 9:
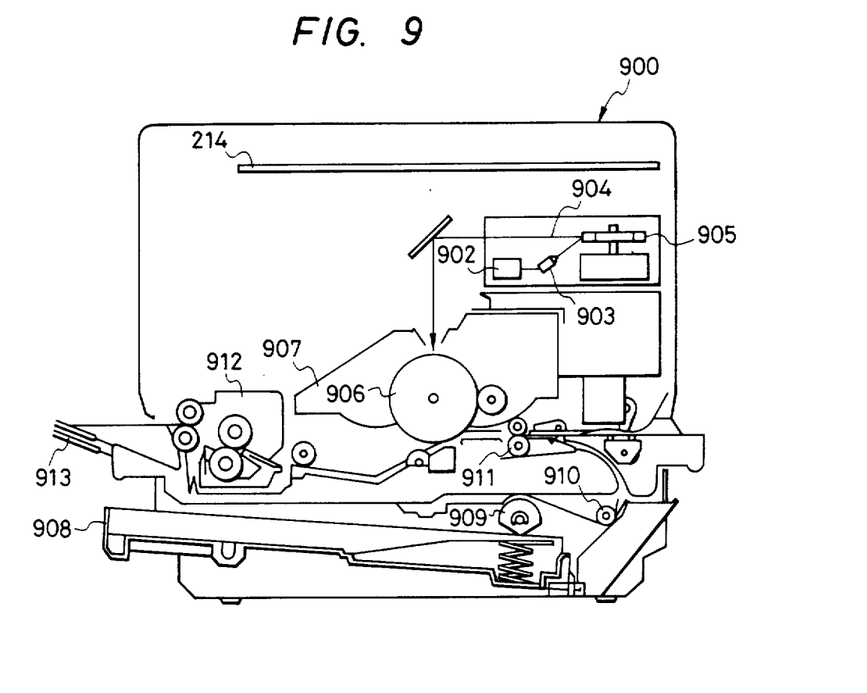
FIG. 9 is a schematic constitutional diagram of a laser beam printer to which the invention can be applied.

FIG. 9 is a cross sectional view showing an internal constitution of a laser beam printer (hereinafter, referred to as an LBP) to which the embodiments can be applied. In FIG. 9, an LBP main unit 900 receives character data which is supplied from the host computer connected in the outside and converts into the corresponding character pattern and forms an image on a paper as a recording medium. Numeral 214 denotes a control board in the embodiment for performing the whole control of the LBP 900 and analyzing the character data or the like which is supplied from the host computer. The printer control units 214a and 214b on the control board 214 mainly convert character data into video signals of the corresponding character patterns and output to a laser driver 902. The laser driver 902 drives a semiconductor laser 903 and on-off switches a laser beam 904 which is emitted from the semiconductor laser 903 in accordance with the input video signal. The laser beam 904 is swung to the right and left by a rotating polyhedron mirror 905 and irradiated onto an electrostatic drum 906. A latent image of the character pattern is formed on the drum 906. After the latent image is developed by a developing unit 907 arranged around the drum 906, it is transferred onto the paper. Cut sheets are used as papers. The cut sheets are enclosed in a paper cassette 908 attached to the LBP 900. The cut sheets are taken into the apparatus by a paper feed roller 909 and carrying rollers 910 and 911 and supplied toward the drum 906. The paper onto which the character pattern is transferred is conveyed to a fixing device 912, by which the pattern image is fixed and thereafter, the paper is ejected to a paper delivery tray 913.

By together applying the first and second embodiments in the invention, a further large effect is derived.

Although the foregoing embodiments have been described using a printer as a representative recording apparatus, the error display method as a technical idea of the invention can be also applied to all apparatuses which intend to permanentally leave an error indication as a visible image to other recording media.

The present invention is not limited to the foregoing embodiments but many modifications and variations are possible within the spirit and scope of the appended claims of the invention.

I claim:

1. A recording apparatus comprising:
   information input means for inputting information to be recorded and a control command to process said recording information;
   means for recording onto a recording medium in accordance with the information input from said information input means;
   means for detecting an error in the input control command;
   means for outputting data indicative of the occurrence of the error when the error has been detected by said detecting means; and
   means for controlling said recording means in order to record the data indicative of the occurrence of the error onto the recording medium.

2. A recording apparatus according to claim 1, wherein said control means records the data indicative of the occurrence of the error onto the recording medium together with the data based on the recording information.

3. A recording apparatus according to claim 1, wherein said control means records the data indicative of the occurrence of the error to an end portion on the recording medium.

4. A recording apparatus according to claim 1, further having means for counting the number of errors detected by said detecting means, and wherein said output means outputs the data corresponding to the number of detected errors.

5. A recording apparatus according to claim 1, wherein said detecting means has a memory in which a plurality of control commands are stored, the input control command is compared with the content of said memory, and when he corresponding control command does not exist, it is determined that an error has occurred.

6. A recording apparatus according to claim 5, wherein when the control command corresponding to the input control command exists, said detecting means discriminates whether a parameter of the input control command is proper or not, and when it is improper, the detecting means determines that an error has occurred.

7. A recording apparatus according to claim 5, wherein when the value of said parameter is out of a predetermined range, said detecting means determines that an error has occurred.

8. A recording apparatus according to claim 6, wherein when the number of parameters is not a predetermined number, said detecting means determines that an error has occurred.

9. A recording apparatus comprising:
   information input means;
   means for recording onto a recording medium in accordance with the information input by said information input means;
   means for detecting an error in said input information;
   means for outputting data indicative of the occurrence of the error when the error was detected by said detecting means, said output means outputting different data in accordance with the kind of error; and
   means for controlling said recording means so as to record the data indicative of the occurrence of the error onto the recording medium.

10. A recording apparatus according to claim 9, wherein said control means makes different recording position of the data indicative of the occurrence of the error on the recording medium in accordance with the position of the occurrence of the error.

11. A recording apparatus according to claim 10, wherein said control means allows the data indicative of the occurrence of the error to be recorded at the position of the occurrence of the error.

12. A recording apparatus according to claim 9, wherein said output means outputs a graphic pattern corresponding to the kind of error.

13. A recording apparatus according to claim 9, wherein said output means outputs numerical value data corresponding to the kind of error together with the data indicative of the occurrence of the error.

* * * * *

UNITED STATES PATENT AND TRADEMARK OFFICE
CERTIFICATE OF CORRECTION

PATENT NO. : 4,814,892
DATED : March 21, 1989
INVENTOR(S) : MASARU IGARASHI

It is certified that error appears in the above-identified patent and that said Letters Patent is hereby corrected as shown below:

COVER PAGE,

[57], line 3, "command" should read --commands--.

COLUMN 2, line 47, "later;" should read --after;--;

line 48, "CP" should read --CPU--.

COLUMN 4, line 21, "process" should read --processed--.

COLUMN 6, line 20, "in" should read --into--.

COLUMN 7, line 65, "permanentally" should read --permanently--.

COLUMN 8, line 37, "he" should read --the--.

Signed and Sealed this

Twelfth Day of December, 1989

Attest:

JEFFREY M. SAMUELS

Attesting Officer      Acting Commissioner of Patents and Trademarks